(12) United States Patent
Yoo

(10) Patent No.: US 12,495,745 B2
(45) Date of Patent: Dec. 16, 2025

(54) PLANT CULTIVATION APPARATUS

(71) Applicant: LG Electronics Inc., Seoul (KR)

(72) Inventor: Imsung Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 633 days.

(21) Appl. No.: 17/559,481

(22) Filed: Dec. 22, 2021

(65) Prior Publication Data

US 2022/0192107 A1    Jun. 23, 2022

(30) Foreign Application Priority Data

Dec. 22, 2020   (KR) .................. 10-2020-0181110

(51) Int. Cl.
*A01G 9/24* (2006.01)
*A01G 31/02* (2006.01)
*A01G 31/06* (2006.01)

(52) U.S. Cl.
CPC ............. *A01G 9/247* (2013.01); *A01G 31/06* (2013.01); *A01G 31/065* (2025.01)

(58) Field of Classification Search
CPC .. A01G 9/247; A01G 31/06; A01G 2031/006; A01G 31/00; A01G 31/02
See application file for complete search history.

(56) References Cited

U.S. PATENT DOCUMENTS

| | | | | |
|---|---|---|---|---|
| 6,668,486 B2* | 12/2003 | Lo | ........................ | A01G 31/06 47/61 |
| 7,278,237 B2* | 10/2007 | Okabe | .................... | A01G 9/246 47/60 |
| 9,655,304 B2* | 5/2017 | Hashimoto | ........... | E04D 11/002 |
| 11,470,790 B2* | 10/2022 | Adams | .................... | A01G 31/06 |
| 2012/0279127 A1* | 11/2012 | Yusibov | ................. | A01G 31/06 47/65.5 |
| 2013/0247462 A1* | 9/2013 | Leslie | .................... | A01G 9/247 47/82 |

(Continued)

FOREIGN PATENT DOCUMENTS

| | | | |
|---|---|---|---|
| CN | 110301342 A | * | 10/2019 |
| KR | 20030084609 | | 11/2003 |

(Continued)

OTHER PUBLICATIONS

Merged English translation of CN 110301342 A. (Year: 2019).*
Extended European Search Report in European Appln. No. 21217053.4, dated May 6, 2022, 8 pages.

*Primary Examiner* — Peter M Poon
*Assistant Examiner* — Hae Rie Jessica Byun
(74) *Attorney, Agent, or Firm* — Fish & Richardson P.C.

(57) ABSTRACT

A plant cultivation apparatus includes a cabinet, a bed disposed in the cabinet, a cultivator configured to be disposed on the bed and to accommodate a cultivation medium therein, where the cultivation medium is configured to accommodate at least portion of a plant, and the cultivator defines a cover water channel at a top surface thereof, and a water supply disposed inside the cabinet and configured to supply water to the cover water channel, where at least a portion of the water supply is located above the cover water channel. The cover water channel is in fluid communication with an inside of the cultivator and configured to guide the water supplied from the water supply to the cultivation medium in the inside of the cultivator.

19 Claims, 14 Drawing Sheets

(56) References Cited

U.S. PATENT DOCUMENTS

| | | | |
|---|---|---|---|
| 2014/0069009 A1* | 3/2014 | Lin | A01G 31/02 |
| | | | 47/62 C |
| 2018/0103599 A1* | 4/2018 | Zhan | A01G 9/249 |
| 2018/0325038 A1* | 11/2018 | Spiro | A01G 9/24 |
| 2019/0335691 A1* | 11/2019 | Krakover | A01G 31/06 |
| 2021/0007307 A1* | 1/2021 | Adams | A01G 31/02 |

FOREIGN PATENT DOCUMENTS

| | | |
|---|---|---|
| KR | 10-2012-0060087 | 6/2012 |
| KR | 20130022838 | 3/2013 |
| KR | 10-1394379 | 5/2014 |
| KR | 101402782 | 6/2014 |
| KR | 20200099340 A * | 8/2020 |
| KR | 20200100499 | 8/2020 |

\* cited by examiner

PLANT CULTIVATION APPARATUS

CROSS-REFERENCE TO RELATED APPLICATIONS

This application claims the benefit of Korean Patent Application No. 10-2020-0181110, filed on Dec. 22, 2020, which is hereby incorporated by reference as when fully set forth herein.

TECHNICAL FIELD

The present disclosure relates to a plant cultivation apparatus, and more specifically, to a plant cultivation apparatus including a water supply configured to supply water to a cultivator.

BACKGROUND

A plant cultivation apparatus refers to an apparatus that can perform plant cultivation by supplying light energy, moisture, soil, and temperature for plant growth. For example, the plant cultivation apparatus may have a predetermined cultivation space defined therein, provide an environment suitable for plant growth, and cultivate and store the plant in the predetermined cultivation space.

In some cases, the plant cultivation apparatus may include components for supplying moisture and nutrients for plant growth. Further, the plant cultivation apparatus can include a component for artificially supplying light energy. In some cases, the plant cultivated in the plant cultivation apparatus may be supplied with light energy from the plant cultivation apparatus, not from the sun outside the plant cultivation apparatus.

In some examples, a user may not periodically supply moisture or nutrient in a cultivation operation process of the plant. The plant cultivated in the plant cultivation apparatus may grow upon receiving the nutrient, moisture, and light energy supplied from the plant cultivation apparatus.

A scheme of cultivating a plant may include a soil-based cultivation scheme of planting a plant in soil that supplies nutrients and moisture to the plant, and a water-based cultivation scheme for cultivating a plant by supplying to the plant a cultivation medium in which inorganic nutrients for growth are dissolved in water, instead of using soil.

In some cases, there may exist organisms that adversely affect the plant in the soil. Since this water-based cultivation scheme does not use the soil, the plant may not be affected by the organisms, and thus the plant may be more hygienic in the water-based cultivation scheme than in the soil-based cultivation scheme.

The water-based cultivation scheme may be less affected by weather and season. Thus, in some examples, the water-based cultivation scheme may create a more favorable growth condition than the soil-based cultivation scheme may.

In some examples, in order for the plant cultivation apparatus to supply nutrients, water, and light energy to the plant to be used indoors, the water-based cultivation scheme may be more advantageous than the soil-based cultivation scheme using soil.

A hydroponic water-based cultivation scheme is one of the water-based cultivation schemes in which the plant is cultivated so that the roots thereof are received in nutrient liquid and a stem and leaves of the plant are grown in a space above the nutrient liquid.

For instance, a hydroponic water-based cultivation scheme may supply moisture for a plant to a location below the plant. In some cases, the plant cultivation apparatus may cultivate a plant in a hydroponic water-based cultivation scheme, and provide a cultivation medium only to a location below the plant, where a germination rate of the plant may be not constant according to the water-level of the cultivation medium, or the growth of the plant may be poor. Further, when the plant is harvested, the cultivation medium may be exposed to the user, thereby causing inconvenience to the user.

In some examples, a plant cultivation apparatus may supply water to a location below the plant and maintain a pressure generated when the supplied water comes into contact with the plant. In some cases, the roots of the plant may be always contained in the cultivation medium, resulting in poor germination rate and growth of the plant.

Therefore, it may be important to design a plant cultivation apparatus that can increase a plant germination rate and lower a failure of plant growth in the cultivation process according to the hydroponic water-based cultivation scheme.

SUMMARY

The present disclosure describes a plant cultivation apparatus that can supply water to the plant efficiently through a top-down water supply scheme that supplies water to the top of the cultivator and supplies water to the top of the cultivation medium.

The present disclosure further describes a plant cultivation apparatus that can increase a germination rate of a plant and reduce the growth failure via uniform water supply to the cultivation medium.

The present disclosure further describes a plant cultivation apparatus that can enable smooth respiration and nutrient absorption of roots by supplying water to a top of the cultivation medium in which the plant is received.

The present disclosure further describes a plant cultivation apparatus that can increase a germination rate of a plant by feeding sufficient moisture to the seeds of the plant.

The present disclosure further describes a plant cultivation apparatus in which the water stored inside the cultivator is not exposed outwardly or does not come into contact with the user during harvesting of the plant.

The present disclosure further describes a plant cultivation apparatus that can minimize generation of pollutants inside the cultivator via a top-down water supply mode.

According to one aspect of the subject matter described in this application, a plant cultivation apparatus includes a cabinet, a bed disposed in the cabinet, a cultivator configured to be disposed on the bed and to accommodate a cultivation medium therein, where the cultivation medium is configured to accommodate at least portion of a plant, and the cultivator defines a cover water channel at a top surface thereof, and a water supply disposed inside the cabinet and configured to supply water to the cover water channel, where at least a portion of the water supply is located above the cover water channel. The cover water channel is in fluid communication with an inside of the cultivator and configured to guide the water supplied from the water supply to the cultivation medium in the inside of the cultivator.

Implementations according to this aspect can include one or more of the following features. For example, the cultivator can include a cultivation vessel that is configured to be disposed on the bed and has an open top, and a cover configured to cover at least a portion of the open top of the cultivation vessel, where the cover defines the cover water channel at an upper surface of the cover. In some examples, the cover can include a cultivation medium receiving portion that is configured to accommodate an upper end of the cultivation medium and defines a first inflow hole configured to supply the water from the cover water channel to the cultivation medium. The cover water channel can overlap with at least a portion of the cultivation medium receiving portion.

In some examples, the cover water channel can include a first cover water channel that extends from a first side of the cover to a second side of the cover and a second cover water channel branched from the first cover water channel. The cover can include a plurality of cultivation medium receiving portions that are configured to accommodate upper ends of a plurality of cultivation media, respectively, and that are disposed in the first cover water channel and the second cover water channel. In some examples, the cover water channel can be recessed from a portion of the upper surface of the cover, and the cultivation medium receiving portion can be disposed in the cover water channel and protrude upward relative to a bottom surface of the cover water channel.

In some implementations, the cultivation medium receiving portion can be positioned within the cover water channel and configured to be surrounded by the water received in the cover water channel, and the first inflow hole can be defined at a periphery of the cultivation medium receiving portion. In some examples, the cultivation medium receiving portion can have an inner surface configured to contact the cultivation medium that is inserted to the cultivation medium receiving portion, where the first inflow hole passes through the inner surface of the cultivation medium receiving portion and is configured to supply the water received in the cover water channel to the cultivation medium. In some examples, at least a portion of the first inflow hole can be defined at the bottom surface of the cover water channel.

In some examples, the cover water channel can include a sidewall that faces the cultivation medium receiving portion and is horizontally spaced apart from the cultivation medium receiving portion. In some examples, the cover can define a second inflow hole in the cover water channel, the second inflow hole being in fluid communication with an inside of the cultivation vessel, and the cultivation medium receiving portion can define a cover through-hole at a top surface thereof, where the cover through-hole is configured to receive the plant based on the plant growing therethrough. A vertical level of the cover through-hole can be higher than a vertical level of the second inflow hole such that the cultivation medium receiving portion can block water in the cover water channel from flowing into the cover through-hole.

In some implementations, the cover further can include a protrusion that is disposed in the cover water channel and protrudes upward from the bottom surface of the cover water channel, where the protrusion defines the second inflow hole at a top surface thereof. In some implementations, the cover further can include a first protrusion that is located at a first side of the cover, that is disposed in the cover water channel, and that protrudes upward from the bottom surface of the cover water channel, where the first protrusion defines the second inflow hole at a top surface thereof, and a distance between the first protrusion and the water supply is less than a distance between the cultivation medium receiving portion and the water supply.

In some examples, the cover can further include a second protrusion that is located at a second side of the cover, that is disposed in the cover water channel, and that protrudes upward from the bottom surface of the cover water channel, where the second protrusion defining another second inflow hole at a top surface thereof. In some examples, the vertical level of the second inflow hole can be lower than a vertical level of the upper surface of the cover. In some examples, the water supply can define a discharge outlet configured to discharge water to the cover water channel, and the cover can include a water collecting recess defined at a side of the cover water channel. The water collecting recess can be located below the discharge outlet and configured to receive the water discharged from the discharge outlet and to provide the received water to the cover water channel. In some examples, the first protrusion is one of a pair of first protrusions that protrude from the bottom surface of the cover water channel, and the water collecting recess can be defined between the pair of first protrusions.

In some implementations, the cultivator can further include an indicator that covers at least a portion of the upper surface of the cover, where the indicator is configured to expose the water collecting recess to an outside of the cultivator. In some examples, the cultivation vessel can define a discharge hole configured to discharge water in the cultivation vessel to the bed, and the bed can define a water discharge channel configured to receive the water discharged from the discharge hole and to guide the received water to the water supply.

In some implementations, the water supply can include a storage configured to store water and a supply channel that is connected to the storage and extends to a position above the cover water channel. The supply channel can be configured to supply the water from the storage to the cover water channel, and the water discharge channel can be connected to the storage and configured to guide the water discharged through the discharge hole into the storage. In some examples, the water supply can further include a water supply casing that defines the storage and is disposed below the bed and a supply pump configured to move the water from the storage to the position above the cover water channel through the supply channel.

DETAILED DESCRIPTION

Hereinafter, one or more implementations of the present disclosure will be described in detail with reference to the accompanying drawings. The same reference numbers can be allocated to the same or similar components.

Figure 1:
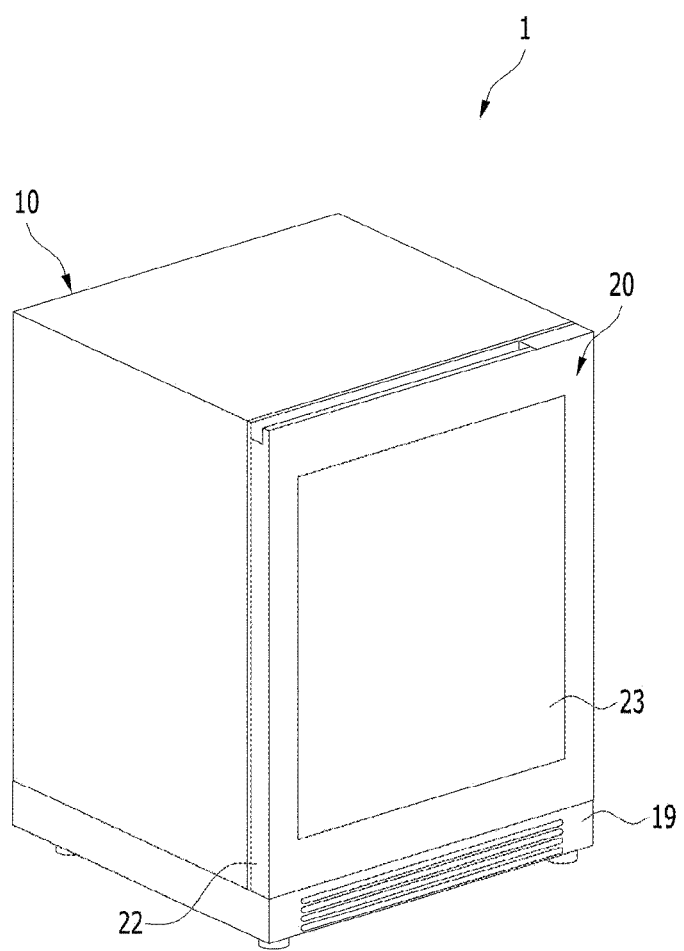
FIG. 1 is a perspective view showing an example of a plant cultivation apparatus.
Figure 2:
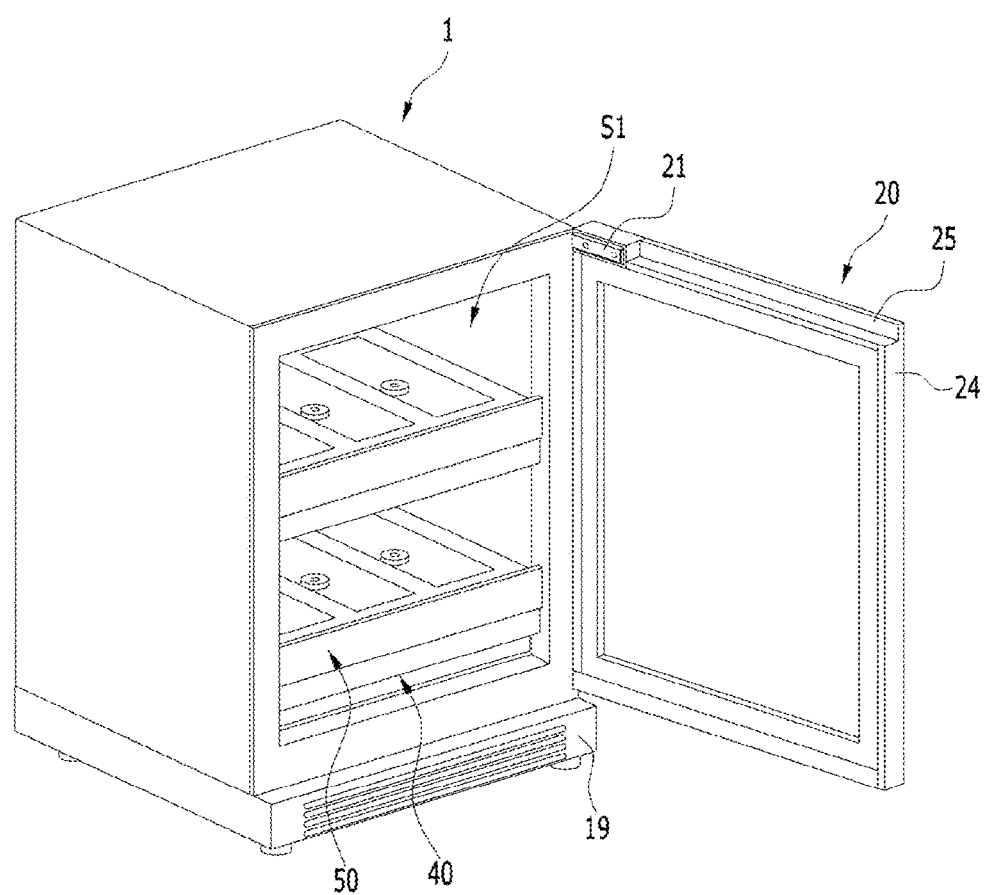
FIG. 2 is a perspective view showing an example of a door of the plant cultivation apparatus.

FIG. 1 is a perspective view showing an example of a plant cultivation apparatus 1. FIG. 2 is a perspective view showing an example of a door 20 that is opened in the plant cultivation apparatus 1.

In some implementations, as shown in FIG. 1 and FIG. 2, the plant cultivation apparatus 1 includes a cabinet 10 having a cultivation space S1 defined therein in which a plant is cultivated, and the door 20 for opening and closing the cabinet 10. An outer appearance of the plant cultivation apparatus 1 can be defined by the cabinet 10 and the door 20.

For instance, the plant cultivated in the cultivation space S1 can include a various types of plants, for example, that can be eaten by a user, can be easily cultivated, and may not occupy a lot of space, such as leafy vegetables and herbs.

The cabinet 10 can have one open face having an opening defined therein. The cultivation space S1 can be defined in the cabinet 10. The cabinet 10 can have a rectangular parallelepiped shape as shown in the drawing, but is not necessarily limited thereto. The cabinet 10 can be formed in various forms such as a cylinder and a sphere as long as the cultivation space S1 can be defined therein.

Further, as shown in FIG. 1 and FIG. 2, the door 20 can be sized to shield the opening of the cabinet 10. Hereinafter, for convenience of descriptions, the open face defines a front face of the cabinet 10. However, the disclosure is limited thereto.

The door 20 can have a door panel 23 which is at least partially transparent. The door panel 23 can be made of a glass or a transparent plastic material such that the user can see through the door panel 23 into an inside of the cabinet.

Due to this structure, the user can visually identify the inside of the cultivation space S1 even when the door 20 is closed, so that a growth state of the plant can be identified by the user. Further, interior effects can be derived. When the identification of the inside of the cabinet is unnecessary, a neat outer appearance of the apparatus can be maintained.

In some cases, a colored coating or a vapor deposited film can be attached to the door panel 23. Thus, the door panel 23 can be constructed such that the cultivation space S1 is selectively visible or invisible to the user.

In some implementations, the door 20 can include a door frame 22 that constitutes a perimeter of the door. A central portion of the door frame 22 can be opened to define an opening. The door panel 23 can be constructed to shield the opening of the door frame 22.

Further, the door 20 can include a door sealing 24 disposed on one face of the door frame 22 facing toward the cabinet 10 and disposed along a perimeter of the opening of the door frame 22.

The door sealing 24 can absorb an impact force exerted from the door 20 onto the cabinet 10 when the door 20 is closed, thereby improving durability and reliability of the plant cultivation apparatus 1.

Further, the door sealing 24 can prevent air flow from the cultivation space S1 and the cabinet 10 to the outside so that a temperature and a humidity of the cultivation space S1 can be kept constant. Further, the door sealing 24 can be made of an insulating material so that the cabinet 10 can be thermally insulated. Accordingly, the cultivation space S1 can maintain a temperature thereof set by the user.

In some implementations, the door 20 can have a door coupler 21 disposed on one side of the door frame 22 and coupled to the cabinet 10. As shown in FIG. 1 and FIG. 2, the door coupler 21 can be disposed on one side of left and right sides of the door frame 22. For example, the door coupler 21 can include a hinge.

Accordingly, the door can be opened and closed in one direction of left and right directions around the user, thereby increasing the user's convenience. Further, the door 20 can be pivotably coupled to the cabinet 10 via the door coupler 21. The cultivation space S1 can be opened and closed according to pivoting of the door 20. Further, the door 20 can have a door handle 25 disposed at one of an upper end and a lower end of the door frame 22. The user can hold the door handle 25 to open and close the door 20.

In some implementations, a lower cabinet 19 can constitute a bottom portion of the cabinet 10. The lower cabinet 19 can receive an air adjuster therein that receives outside-air and supplies the outside-air to the cultivation space S1.

In some implementations, the plant cultivation apparatus 1 can include a plurality of beds 50 vertically arranged inside the cabinet 10. For example, two beds 50 can be respectively disposed in an upper portion and a lower portion of the cabinet 10. Hereinafter, for convenience of description and understanding, the two beds 50 can be referred to as an upper bed 50 and a lower bed 50, respectively. In another example, at least three or more beds 50 can be arranged depending on a size of the cabinet 10.

Further, a plurality of cultivators 60 containing plant seeds and nutrients for cultivation can be seated on a top face of the bed 50. Thus, the bed 50 can be referred to as a shelf or a tray. The interior of the cabinet 10 can act as the cultivation space S1 in which the plant is cultivated.

The cultivator 60 can be provided to be adapted to a combination of various kinds of seeds and corresponding nutrients. The user can select the cultivator to be adapted to a target plant type for cultivation. Further, the bed 50 can have a structure on which the cultivator 60 can be seated and by which a seating state thereof can be maintained.

Further, as will be described later, the bed 50 can have water discharge holes 512 defined therein through which water supplied from a water supply 40 flows. Further, the bed 50 can maintain an adequate water-level therein so that water can be supplied to the cultivator 60 at all times.

Figure 3:
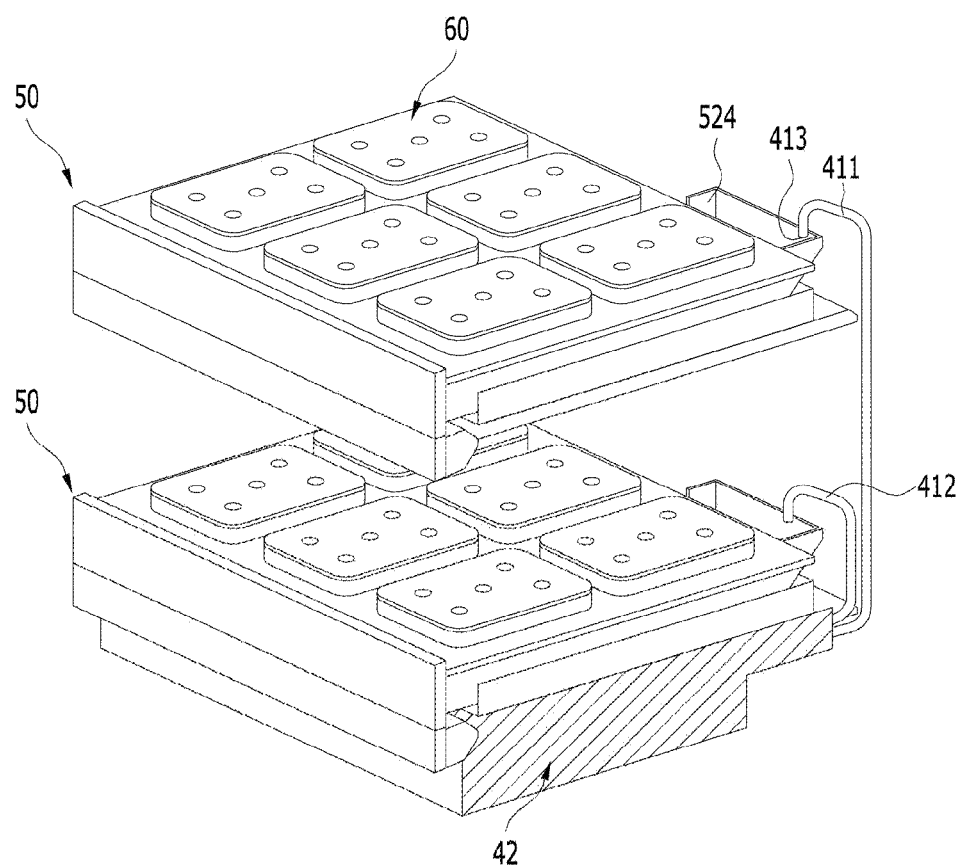
FIG. 3 is a perspective view showing an example of a cultivator seated on a bed in the plant cultivation apparatus.

FIG. 3 is a perspective view showing an example of a cultivator seated on a bed in a plant cultivation apparatus.

For example, FIG. 3 shows the bed 50, the water supply 40, and the cultivator 60 disposed inside the cabinet 10 in the plant cultivation apparatus 1.

The plant cultivation apparatus 1 can include the bed 50 disposed inside the cabinet, the cultivator 60 seated on the bed and receiving therein a cultivation medium 64 in which at least a portion of the plant is received, and the water supply 40 disposed inside the cabinet and constructed to supply water to the bed 50.

The cultivation medium 64 can contain plant seeds. The roots of the plant can extend through the cultivation medium and receive the nutrient liquid.

The water supply 40 can include a water supply casing 42 having storage 43, a supply pump 44, a flow sensor 45, a branching valve 46, and a connective channel 47 as described below received therein.

The storage 43 can store therein water to be supplied to the cultivator 60 for the plant. The storage 43 can store the water collected from the cultivator 60. For example, the storage 43 can be a space defined by the water supply casing 42 or a separate reservoir disposed in the water supply casing 42.

As shown in FIG. 3, the water supply casing 42 can be disposed below the bed and can be coupled to the cabinet 10.

Due to the water supply casing 42, the water supply casing 42 having storage 43, the supply pump 44, the flow sensor 45, the branching valve 46, and the connective channel 47 are not exposed to the outside, thereby improving the reliability of the water supply 40, and achieving neat outer appearance thereof.

In some implementations, the cultivator 60 can be seated on the bed. The nutrient liquid (hereinafter, water) from the water supply 40 can be fed to the cultivator 60 through the water discharge channels 4911 and 4913 which will be described later. The cultivator 60 can be constructed such that the water can be discharged to the storage through the water discharge channels 4911 and 4913.

In some examples, the cultivator 60 can include a plurality of cultivators disposed on a top face of the bed 50. Thus, the plurality of cultivators 60 can receive different types of plants, respectively. Thus, the different types of plants can be cultivated in the cultivation space S1.

In other words, the cultivator 60 can be provided to be adapted to a combination of various kinds of seeds and corresponding nutrients. The user can select a plant to be cultivated and cultivate the plant in the cultivator 60.

In some examples, the cultivator 60 can be removably seated on the bed 50. Accordingly, the user can input the cultivation medium 64 containing the seeds of the plant therein into the cultivator 60 while the cultivator 60 is located out of the plant cultivation apparatus 1. Then, the user can seat the cultivator 60 on the bed 50 through one open face of the cabinet 10.

In some examples, when the plant grows and then a harvest timing arrives, the user can separate the cultivator 60 from the bed 50. Thus, the plant in the cultivator 60 can be easily harvested while the cultivator is located out of the plant cultivation apparatus 1, thereby increasing easiness and convenience of harvesting by the user.

In some examples, the cultivator 60 can have a shape extending from one side thereof to the opposite side thereof. A direction in which the cultivator 60 extends can be a first direction from the cultivation space S1 toward the door 20. Further, the direction in which the cultivator 60 extends can be defined in any direction on the bed 50.

In some examples, while being seated on the top face of the bed 50, the plurality of cultivators 60 can be arranged to be spaced apart from each other in the first direction in which the cultivator 60 extends and a second direction perpendicular to the first direction.

Hereinafter, for convenience of description, a direction in which the cultivator 60 extends is defined as the first direction, while a direction perpendicular to the first direction is defined as the second direction.

In some implementations, the bed 50 can include a rectangular plate that partitions an inside of the cabinet 10. In some cases, the bed 50 can be seated into a retract-extend guide defined in each of both opposing side faces of the cabinet 10 in the retracting and extending manner.

A bed water collector 524 constructed to receive water through the water supply channel can be formed in one side of the bed 50. The bed water collector 524 can be connected to the water discharge channels 4911 and 4913 disposed inside the bed 50, such that the water supplied to the bed water collector 524 can be continuously supplied to the cultivator 60.

The water supply channel can include a first supply channel 411 extending to the bed water collector 524 of the upper bed 50 and a second supply channel 412 extending to the bed water collector 524 of the lower bed 50. The first supply channel 411 and the second supply channel 412 can be constructed to supply the water to the upper bed 50 and the lower bed 50, respectively.

The water supply channel can have water discharge outlets 413 defined respectively at positions corresponding to the water collectors 625. Thus, the water supplied from the first supply channel 411 and the second supply channel 412 can be directly inflowed to the bed water collectors 524. For example, the water discharge outlets 413 can include holes, respectively. For example, the water collectors 625 can be recesses defined for receiving water discharged from the water discharge outlets 413 and configured to provide the water to the cover water channel 65.

Each of the first supply channel 411 and the second supply channel 412 can include a pipe made of metal such as stainless steel or some other materials. Thus, each of the first supply channel 411 and the second supply channel 412 can be managed hygienically and can be maintained in a rigid manner to help to prevent or reduce clogging thereof due to deformation or bending of a flow path, and to improve the reliability of water supply.

A water supply structure in which the water is fed to the upper bed 50 and a water supply structure in which the water is fed to the lower bed 50 can be the same only except for a difference in a vertical position thereof. The water supplied to the bed water collector 524 can supply moisture to the cultivator 60 mounted on the bed 50.

Figure 4A:
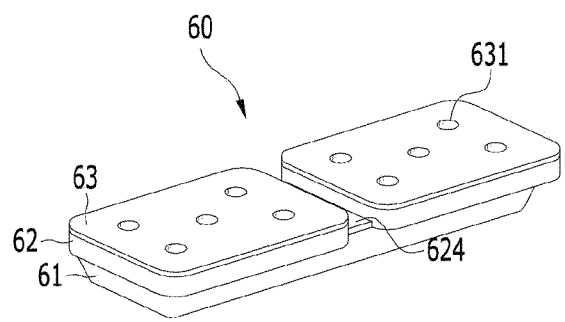
FIGS. 4A and 4B are a perspective view and an exploded view showing an example of the cultivator in the plant cultivation apparatus.
Figure 4B:
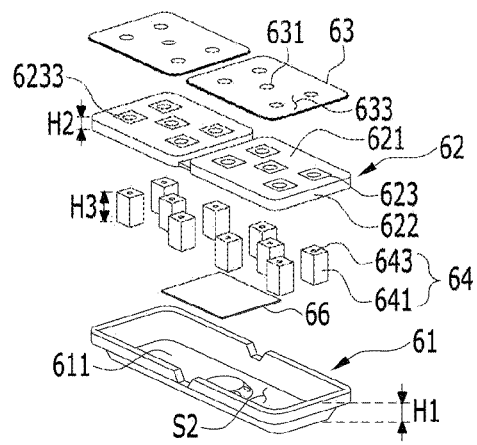

FIG. 4A is a perspective view showing an example of a cultivator in the plant cultivation apparatus. FIG. 4B is an exploded view showing an example of the cultivator in the plant cultivation apparatus.

In some implementations, as shown in FIGS. 4A and 4B, the cultivator 60 can include a cultivation vessel 61 seated on the bed 50 and constructed to have an open top, and a cover 62 for shielding the open top of the cultivation vessel 61.

The cultivation vessel 61 can be constructed to have the open top, and can be seated on the bed 50. The cultivation vessel 61 can be constructed to have in a size and a shape corresponding to those of a bed receiving portion 521 defined in a top face of the bed 50.

The cultivation vessel 61 can be sized to be received in the bed receiving portion 521. Accordingly, the user can select the cultivator 60 corresponding to a type of the plant to be cultivated and can seat the selected cultivator 60 at a position on the bed 50 to start cultivation of the plant.

Further, the cultivation vessel 61 can include a vessel body a bottom face 611 of the cultivation vessel and can include having the cultivation medium receiving space S2 therein. The cultivation vessel 61 can further include a vessel coupler 6151 that extends outwardly from the vessel body and is coupled to the cover 62.

The vessel coupler 6151 can further include a groove 6153 extending vertically. Thus, the cover can be press-fitted to the cultivation vessel 61.

Further, the cultivation vessel can have a discharge hole 6135 defined therein through which water of the cultivation medium receiving space is discharged to the water discharge channels 4911 and 4913. Water can either flow from the water supply 40 through the discharge hole 6135 into the cultivation medium receiving space or water from the cultivation medium receiving space can be collected back into the water supply 40 through the discharge hole 6135.

Further, the discharge hole 6135 can be defined in the bottom face 611 of the cultivation vessel 61, and can communicate with the water discharge channels 4911 and 4913 defined in the bed.

The cultivator 60 can include a cultivation filter 66 disposed on the bottom face 611 of the cultivation vessel 61 for removing foreign substances from the water discharged or inflowing through the discharge hole 6135. The foreign material removed using the cultivation filter 66 can be a portion of the cultivation medium 64 produced in the plant growth process, or can be a portion of the root of the plant.

Further, the foreign material can be a portion of a stem or a leaf of a plant that is produced due to a top water supply structure to be described later. The cultivation filter 66 can be constructed to shield the discharge hole 6135, and to block inflow of foreign substances as produced in the cultivation medium receiving space into the water supply 40.

In some implementations, the cultivation vessel 61 can have the cultivation medium receiving space S2 defined therein for receiving therein the cultivation medium 64 in which at least a portion of the plant is received. The cultivation medium 64 can be received in the cultivation medium receiving space S2 defined in the cultivation vessel 61. The cultivation medium 64 can extend vertically from the bottom face 611 of the vessel toward the cover 62 by a predetermined vertical dimension H3.

Nutrients for the plant growth can be contained in the cultivation medium 64. When only water is supplied to the cultivation medium 64 without supply of additional components thereto, the plant growth can proceed at an adequate rate.

Further, the cultivation medium 64 can include a cultivation medium body 641 that defines the outer appearance of the cultivation medium 64 and a cultivation medium hole 643 that is defined at a top portion of the cultivation medium body. The cultivation medium 64 contains the seeds of the plant. The cultivation medium can be made of various materials capable of absorbing the water stored in the cultivation medium receiving space S2 and supplying the water to seeds or roots inside the cultivation medium 64.

In some implementations, the cover 62 can cover the cultivation medium receiving space S2 of the cultivation vessel 61. A top of the cultivation vessel 61 is open. Thus, the cover 62 can be disposed at a top of the cultivation vessel and can be coupled to the cultivation vessel 61.

In some implementations, the cultivation medium receiving space S2 can store therein water supplied to the cultivation medium 64. When the water is exposed to air out of the cultivator and to light from an artificial light source, reproduction of microorganisms in the water can become active, thereby adversely affecting the growth of the plant.

In order to help to prevent this situation, the cover 62 can cover the cultivation medium receiving space S2 of the cultivation vessel 61, so that the cultivation medium receiving space is prevented from being exposed to an environment out of the cultivator 60.

Due to the cover 62, the water stored inside the cultivation medium receiving space S2 can be prevented from being exposed to light irradiated from the artificial light source disposed above the top of the cultivator 60. Contact of the water with the air outside the cultivator 60 can be prevented.

Further, due to the cover 62, the roots of the plant grown in the cultivation medium 64 can be prevented from being exposed to the light source, so that the growth of the plant can be improved.

The cover 62 can be constructed to be coupled to the top face and the outer face of the vessel coupler 6151 while being disposed above the vessel coupler 6151. The cover 62 can be coupled to the vessel coupler 6151 in a bolt-nut structure. The disclosure is not limited thereto. Hereinafter, as shown in the drawings, an example in which the cover 62 is coupled to the vessel coupler 6151 of the cultivation vessel 61 in a press-fitting manner is described.

The cover 62 is coupled to the vessel coupler 6151 of the cultivation vessel 61 in a press-fitting manner. The cover can include a cover coupler 624 which is formed in a position corresponding to that of the groove 6153 and is inserted into the groove 6153.

In some implementations, the cover 62 can include a cultivation medium receiving portion 623 which is formed at a position corresponding to that of the cultivation medium 64 and into which an upper end of the cultivation medium is inserted. Due to the cultivation medium receiving portion 623, the cultivation medium 64 can be fixedly received inside the cultivation vessel 61 when the cover 62 is coupled to the cultivation vessel.

The cover 62 can have a predetermined vertical dimension H2 and can extend from a bottom to a top thereof. The cultivation medium receiving portion 623 can have a vertical dimension equal to the vertical dimension H2 of the cover 62 such that the upper end of the cultivation medium 64 can be received therein.

The number of the cultivation medium receiving portions 623 can correspond to the number of the cultivation mediums 64. In order to fix the position of the cultivation medium 64, the number of the cultivation medium receiving portions 623 can be greater than or equal to the number of the cultivation medium 64.

As shown in FIG. 4B, the cultivation medium receiving portion 623 can be defined in a top face of the cover. The cultivation medium receiving portion 623 can include a plurality of the cultivation medium receiving portions. The present disclosure is not necessarily limited thereto. A distance between adjacent ones of the plurality of cultivation medium receiving portions 623 can be appropriately designed according to the type of plant to be cultivated.

The cultivation medium receiving portion 623 can have a cover through-hole 6233 defined at a position thereof corresponding to a position of the cultivation medium 64 so as to expose at least a portion of a top face of the cultivation medium 64. The cover through-hole 6233 can extend through the top face of the cover 62.

A seed of the plant received in the cultivation medium hole 643 germinates. A stem of the plant can extend through the cover through-hole 6233 and can grow toward a space above the top of the cover 62. Therefore, for smooth growth of the plant, a diameter of the cover through-hole 6233 can be defined to be larger than a diameter of the cultivation medium hole 643.

That is, in a top view of the cultivator 60, the cover through-hole 6233 can be defined to expand along a radial direction of the cultivation medium hole 643. The diameter of the cover through-hole 6233 can be appropriately designed in consideration of the size of the plant being cultivated.

Further, a center of the cover through-hole 6233 can be positioned to correspond to a center of the cultivation medium hole 643. Thus, when the plant germinates and grows, and thus extends to be exposed to a space out of the cultivation medium 64, the plant can be recognized by the user due to the cover through-hole 6233.

In some implementations, the cultivator 60 can further include an indicator 63 disposed above the top face of the cover 62 to minimize exposure of the cultivation medium 64. A seed name of the plant can be written on the indicator. The seed name of the plant can be marked on the indicator 63 so that the type of the plant grown in the cultivation space can be easily recognized by the user.

The indicator 63 can be constructed to cover the top face of the cover 62. As shown in the figure, the indicator 63 can include a plurality of indicators and can be disposed above the top face of the cover 62. The indicator 63 can be coupled to a remaining area of the cover 62 except for a cover coupler 624.

Thus, in the top view of the cultivator 60, a top face 633 of the indicator 63 can be exposed to the outside, and a top face of the cover except for the cover coupler 624 may not be exposed to the outside.

The indicator 63 can have an indicator hole 631 defined therein at a position corresponding to that of the cover through-hole 6233 and can have a diameter smaller than the diameter of the cover through-hole 6233, so that exposure of the cultivation medium 64 to the outside can be prevented. The plant can grow and extend through the indication hole 631 and toward a space above the top of the cultivator 60.

Figure 5:
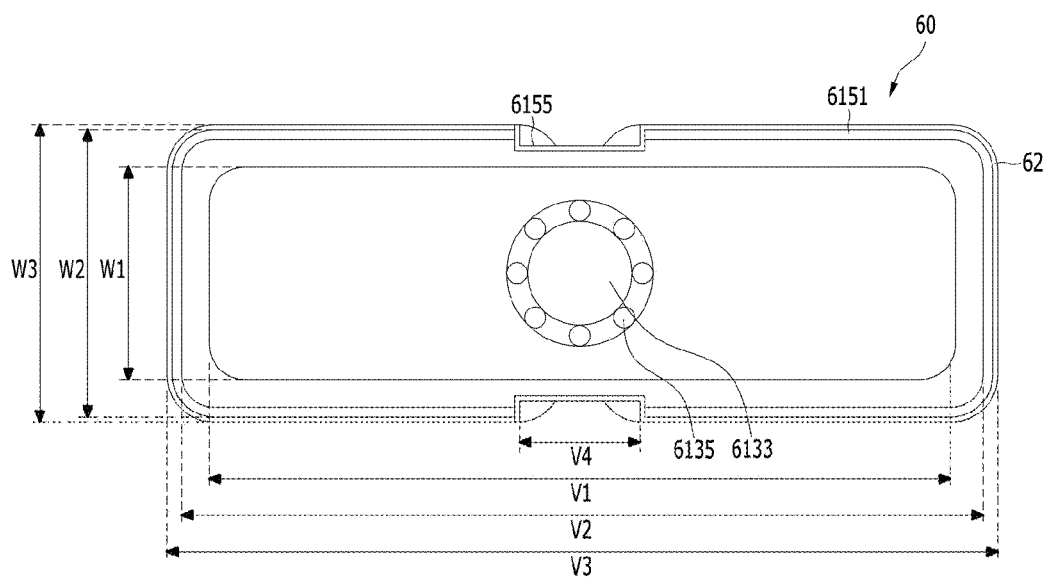
FIG. 5 is a bottom view showing an example of the cultivator in the plant cultivation apparatus.

FIG. 5 is a bottom view showing an example of a cultivator in the plant cultivation apparatus. Hereinafter, descriptions duplicate with those of the above-described structure will be omitted.

FIG. 5 is a bottom view of the cultivator 60. As shown in FIG. 5, a vessel body of the cultivation vessel 61 can further include a receiving recess 6133 that is defined in the bottom face 611 of the cultivation vessel 61 and is recessed upwardly.

The discharge holes 6135 can be defined and can be arranged around the receiving recess 6133. The discharge holes 6135 can be in contact with a seat contact portion 514 formed on the bed 50 which will be described later, so that water in the cultivation medium receiving space S2 is discharged to the water discharge channels 4911 and 4913 through the discharge holes 6135. The water supplied from the supply channel can flow to the discharge holes 6135.

The seat contact portion 514 can protrude from a first bed portion 51 as an upper portion of the bed. A diameter of the upper end of the receiving recess 6133 can be sized in corresponding manner to a size of the seat contact portion 514. An outer circumference face of the seat contact portion 514 can face toward the discharge holes 6135.

Further, as shown, the discharge holes 6135 can be arranged around the receiving recess 6133 and can be spaced apart from each other by the same distance. Accordingly, water supplied from the water supply 40 can be smoothly supplied to the inside of the cultivation medium receiving space S2, and water discharged to the water supply 40 can be smoothly discharged to the outside out of the cultivation medium receiving space S2.

In some implementations, as described above, the cultivator 60 can extend toward the first direction and the second direction. For convenience of description, a length of each of the cultivation vessel 61 and the cover 62 extending in the first direction is defined as a longitudinal length, and a length of each of the cultivation vessel 61 and the cover 62 extending in the second direction perpendicular to the first direction is defined as a transverse length.

A longitudinal length V1 of the bottom face 611 of the cultivation vessel 61 can be sized to be smaller than a longitudinal length V3 of the cover 62. A transverse length W1 of the bottom face 611 can be smaller than a transverse length W3 of the cover 62. Thus, the cultivation medium 64 inside the cultivation vessel 61 can be screened with the cover 62.

The longitudinal length V1 of the bottom face 611 of the cultivation vessel 61 and the transverse length W1 of the bottom face 611 can be determined appropriately based on a size of the plant cultivation apparatus, s size of the plant cultivated therein, a size of the cultivation medium 64 received in the cultivation medium receiving space, etc.

The outermost longitudinal length V2 of the inner face of the vessel body of the cultivation vessel 61 can be sized to be larger than the longitudinal length V1 of the bottom face. The outermost transverse length W2 of the inner face of the vessel body of the cultivation vessel 61 can be larger than the transverse length W1 of the bottom face.

Accordingly, the water can be supplied from the water supply 40 to the cultivation vessel 61 such that a water level in the cultivation medium receiving space S2 may not increase rapidly. Thus, a sufficient amount of the water may be supplied to the cultivation medium 64.

A longitudinal length V1 of the groove 6153 can be sized to be larger than a longitudinal length of the cover coupler 624. This allows the cover 62 to screen an entirety of the cultivation receiving space.

Figure 6:
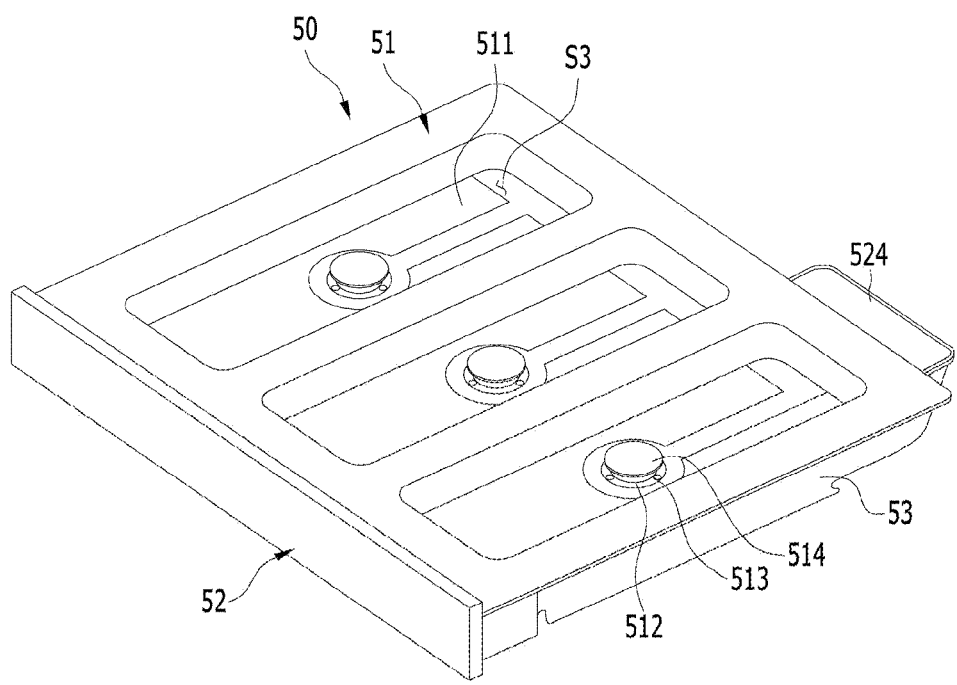
FIG. 6 is a perspective view showing an example of a bed in the plant cultivation apparatus.

In some implementations, FIG. 6 is a perspective view showing a bed in the plant cultivation apparatus.

The bed 50 includes a plurality of beds which can have the same structure except for vertical levels thereof. Thus, only one bed 50 among the plurality of beds will be described by way of example.

In some implementations, the bed 50 can include a rectangular plate that partitions an inside of the cabinet 10. In some cases, the bed 50 can be seated into a retract and extend guide defined in each of both opposing side faces of the cabinet 10 in the retracting and extending manner as described above.

The bed 50 can have a second bed portion 52 constituting a lower portion of the bed 50. Water can be supplied to the second bed portion 52. The second bed portion 52 can define an overall shape of the bed 50, and can be made of a plastic material.

In some implementations, both third bed portions 53 extending laterally and coupled to the second bed portion 52 can be respectively coupled to both opposing ends of the second bed portion 52.

Further, the bed 50 can have the first bed portion 51 disposed on a top pace of the second bed portion 52. The cultivation vessel is seated on the first bed portion 51. The first bed portion 51 can constitute the upper portion of the bed. The first bed portion 51 can be constructed to be detachably coupled to the second bed portion 52.

Specifically, a bed receiving portion 521 can be defined in the second bed portion 52, and the first bed portion 51 can be seated in the bed receiving portion 521. The bed receiving portion 521 can have a shape corresponding to that of the first bed portion 51.

That is, the cultivation vessel receiving portion 511 in which the cultivation vessel 61 is seated can be defined in the first bed portion 51. In this connection, the bed receiving portion 521 can be defined in a position corresponding to that of the cultivation vessel receiving portion 511 and can have a shape corresponding to that of the cultivation vessel receiving portion 511, so that the cultivation vessel receiving portion 511 can overlap the bed receiving portion 521.

The cultivation vessel receiving portion 511 can be recessed in the first bed portion 51 to have a shape corresponding to that of the cultivation vessel 61 so that the cultivation vessel 61 can be detachably received therein. A cultivation vessel receiving space S3 in which the cultivation vessel 61 is seated can be defined in the cultivation vessel receiving portion 511.

In some implementations, the second bed portion 52 can have the bed water collector 524 and the water discharge channels 4911 and 4913 defined therein as passages through which water supplied through the bed water collector 524 flows The water supplied to the cultivator 60 through the water discharge channels 4911 and 4913 can continuously supplied to the cultivator 60. In detail, the water discharge channels 4911 and 4913 can communicate with the bed water collector 524. The water discharge channels 4911 and 4913 can be constructed to communicate with the storage 43 included in the water supply 40 which will be described later, so that the water discharged from the cultivator 60 is discharged to the storage 43 via the discharge channels 4911 and 4913.

In some implementations, the first bed portion 51 can include a seat communication hole 512 extending through a bottom face of the cultivation vessel receiving portion 511 at a position corresponding to a position of the seat contact portion 514. A bottom of the seat communication hole 512 can be in communication with the water discharge channels 4911 and 4913. A top of the seat communication hole 512 can face the seat contact portion 514 such that water discharged or flowing from or into the discharge hole 6135 can flow through the seat communication hole 512.

Further, the first bed portion 51 can include a plurality of seat protrusions 513 formed on a bottom face of the cultivation vessel receiving portion 511 and arranged along the circumference of the seating communication hole 512. A top of the seat protrusion 513 can face the seat contact portion 514, and can be in contact with the bottom face of the seat contact portion 514.

In some implementations, the first bed portion 51 can include a plurality of elastic members disposed between the seat protrusions 513 and arranged along a circumference of the seat communication hole 512. The elastic member can be constructed to press the seat contact portion 514 upwards.

In detail, when the cultivation vessel 61 is seated in the cultivation vessel receiving portion 511, the receiving recess 6133 of the cultivator 60 can come into contact with the seat contact portion 514 and then the seat contact portion 514 can be pushed downwards.

As the seat contact portion 514 moves downwards, the seat contact portion 514 can come into contact with the seat protrusions 513. The water flowing from the water discharge channels 4911 and 4913 can flow into the seating communication hole 512, and then the water can flow or be discharged into or from a space between the seat contact portion 514 and a bottom face of the cultivation vessel receiving portion 511.

Figure 7:
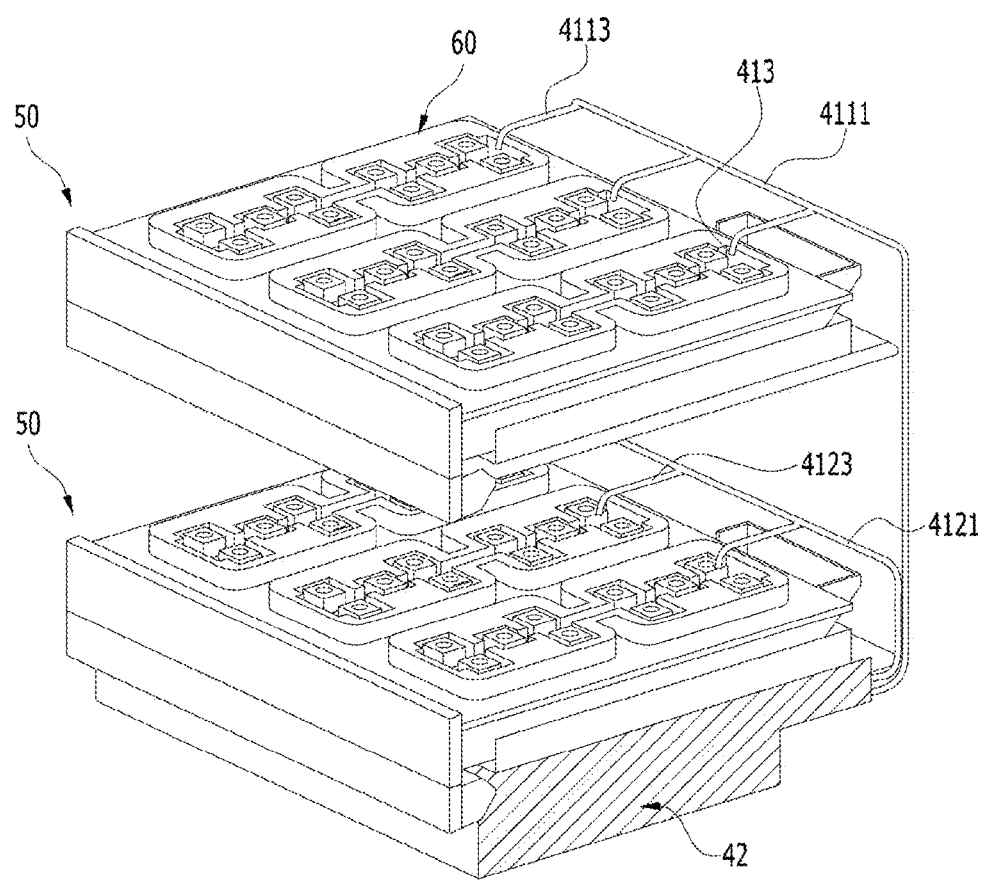
FIG. 7 is a perspective view showing an example of a cultivator seated on the bed in the plant cultivation apparatus.

In some implementations, FIG. 7 is a perspective view showing a state in which an example of a cultivator is seated on a bed in the plant cultivation apparatus. Hereinafter, descriptions duplicate with those of the above-described structure will be omitted.

In the plant cultivation apparatus 1, the cultivator 60 can be seated on the bed 50 and can include a cultivation vessel 61 having an open top, and a cover 62 for shielding the open top of the cultivation vessel 61.

Further, the cover 62 can further include a cover water channel 65 disposed in a top face of the cover 62 of the cultivator 60 for receiving water to be supplied to the plant. The water supply 40 can be disposed inside the cabinet 10 and at least a portion of the water supply 40 can be located above the cover water channel 65 to supply water to the cover water channel 65.

Further, the cover water channel 65 can be disposed in the top face of the cover. The cover water channel 65 can be constructed to communicate with the inside of the cultivator 60 so that the water supplied from the water supply 40 is guided to the cultivation medium therethrough.

The water supply 40 can include a supply channel that supplies water to the cultivator 60, and the storage 43 that supplies water to the cultivator 60 and collects the water therefrom and stores the collected water therein.

As shown in FIG. 3, the water supply channel can be constructed to supply water to the water collector 625 of the bed 50 through the first water supply channel 415. Further, as shown in FIG. 7, the water supply channel can be constructed to supply water to the cover water channel 65.

The supply channel can include a first supply channel 411 for supplying water to the cover water channel 65 of the upper bed 50 of the plurality of beds 50 and a second supply channel 412 supplying water to the cover water channel 65 of the lower bed 50 of the plurality of beds 50.

The first supply channel 411 and the second supply channel 412 can be disposed independently and can extend to face toward the cultivator 60 to supply water for plant growth.

The first supply channel 411 can include a first supply flow channel 4111 connected to the storage 43 and extending upwardly, and acing as a passage through which water from the storage 43 flows upwards, and a plurality of first supply branch channels 4113 branching from the first supply flow channel 4111 and extending towards the cover water channel 65 of the cultivator 60.

The second supply channel 412 can include a second supply flow channel 4121 connected to the storage 43 and extending upwardly, and acing as a passage through which water from the storage 43 flows upwards, and a plurality of second supply branch channels 4123 branching from the second supply flow channel 4121 and extending towards the cover water channel 65 of the cultivator 60.

Figure 8:
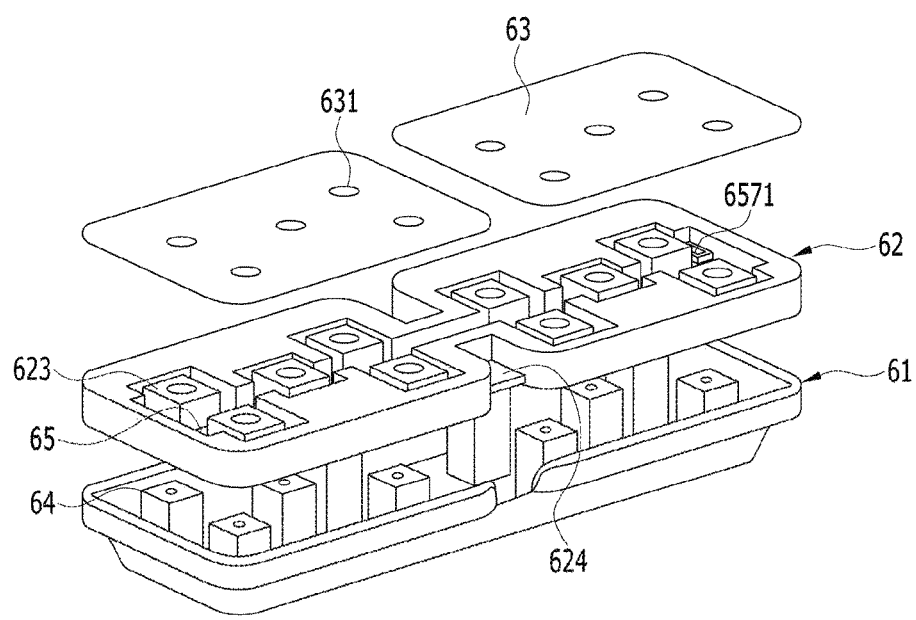
FIG. 8 is an exploded view showing an example of a cultivator in the plant cultivation apparatus.
Figure 9:
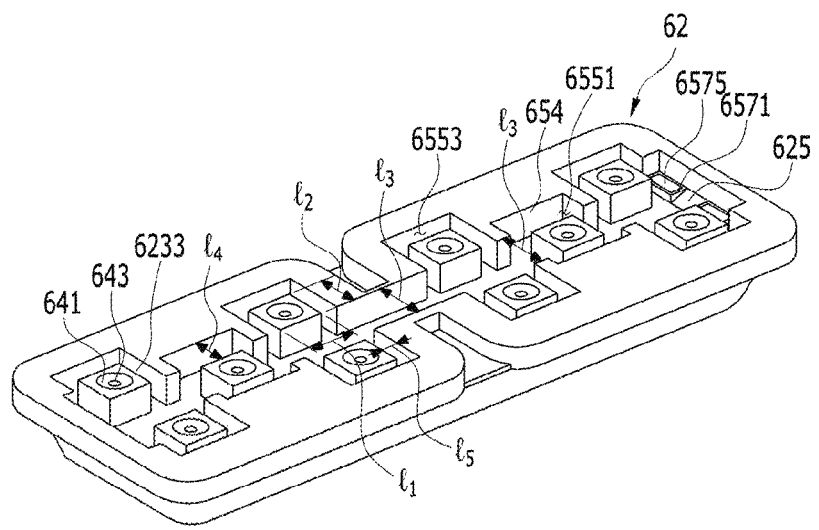
FIG. 9 is a perspective view showing an example of a cultivator in the plant cultivation apparatus.
Figure 10A:
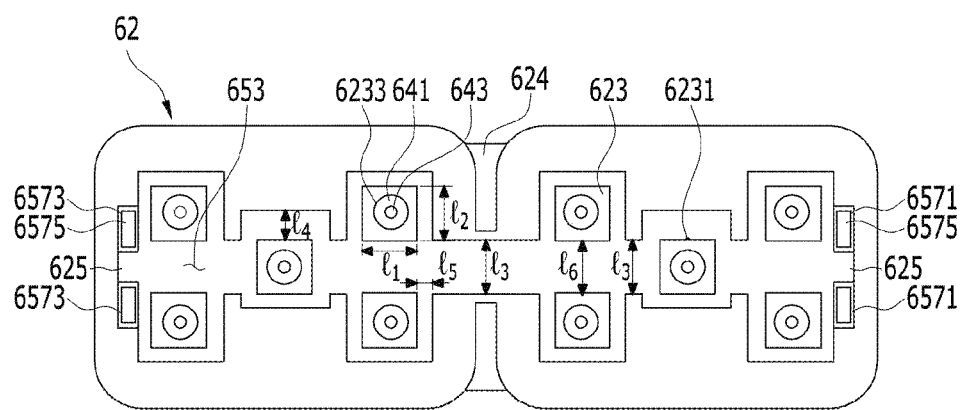
FIGS. 10A and 10B are a top view and a side view showing an example of a cultivator in the plant cultivation apparatus.
Figure 10B:
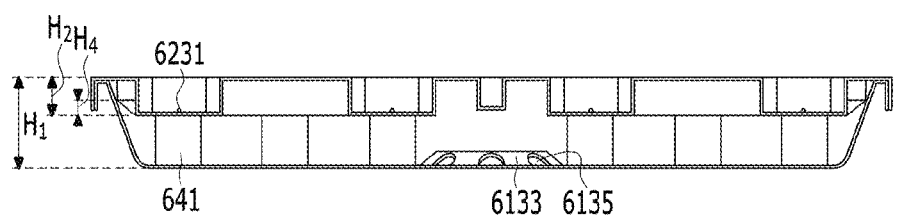

FIG. 8 is an exploded view showing an example of the cultivator in the plant cultivation apparatus. FIG. 9 is a perspective view showing an example of the cultivator in the plant cultivation apparatus. FIG. 10A is a top view of an example of the cultivator in the plant cultivation apparatus, and FIG. 10B is a side view of an example of the cultivator of the plant cultivation apparatus. Hereinafter, descriptions duplicate with those of the above-described structure will be omitted.

The cover water channel 65 can be constructed to overlap with at least a portion of the cultivation medium receiving portion 623. In other words, the cover water channel 65 can be constructed such that one face of the cultivation medium receiving portion 623 is exposed to the inside of the cover water channel 65.

Further, the cultivation medium receiving portion 623 can have a first inflow hole 6231 for providing water from the cover water channel 65 to the cultivation medium 64. The first inflow hole 6231 can be defined to be exposed to the inside of the cover water channel 65. The water supplied from the supply channel to the cover water channel 65 is received in the cover water channel 65, and flows into the first inflow hole 6231, and then is supplied to the cultivation medium 64.

As shown in FIG. 9, the cover water channel 65 can include a first cover water channel 6551 extending from one side to the opposite side of the cover and a second cover water channel 6553 branching from the first cover water channel 6551. A direction in which the first cover water channel 6551 extends can be a direction in which the cultivator 60 extends toward the door 20 as described above.

Further, a direction in which the second cover water channel 6553 branches from the first cover water channel 6551 and extends can be inclined relative to a direction in which the first cover water channel 6551 extends. As shown in FIG. 9, the direction in which the second cover water channel 6553 branches from the first cover water channel 6551 and extends can be perpendicular to the direction in which the first cover water channel 6551 extends.

The second cover water channel 6553 can branch and extend from one end or the other end of the first cover water channel 6551 and/or can branch and extend from a middle point except for one end or the other end of the first cover water channel 6551.

Further, the cover water channel 65 can be defined by depressing a portion of the top face of the cover 62. The cultivation medium receiving portion 623 can protrude upward from a bottom face 653 of the cover water channel 65 and can be positioned inside the cover water channel 65.

As described above, the cultivation medium 64 can include a plurality of mediums. The cultivation medium receiving portion 623 can include a plurality of cultivation medium receiving portions. Thus, the cover water channel 65 can extend so as to connect a plurality of points corresponding to positions of the plurality of cultivation medium 64 to each other.

Further, the plurality of cultivation medium receiving portions 623 can be constructed to be positioned inside the first cover water channel 6551 and the second cover water channel 6553. Accordingly, the first inflow hole 6231 through which the water stored in the cover water channel 65 flows into the inside of the cultivation medium receiving portion 623 can include a plurality of first inflow holes arranged along a circumference of the cultivation medium receiving portion 623. Thus, the water in the cover water channel 65 can be more smoothly supplied to the cultivation medium 64.

As described above, the cultivation medium 64 can be in contact with the inner face of the cultivation medium receiving portion 623. The upper end of the cultivation medium 64 can be inserted into the cultivation medium receiving portion. The first inflow hole 6231 can be constructed to extend from the inner face of the cultivation medium receiving portion 623 toward the cover water channel 65 to guide the water received in the cover water channel 65 to the cultivation medium 64.

That is, one end of the first inflow hole 6231 can be exposed toward the interior of the cover water channel 65, and the other end of the first inflow hole 6231 can be in contact with the upper end of the cultivation medium 64.

Accordingly, water from the cover water channel 65 can be supplied to the cultivation medium 64 through the first inflow hole 6231.

The smaller a vertical dimension from the bottom face 653 of the cover water channel 65 to the first inflow hole 6231, the more efficiently the inflow of water from the cover water channel 65 to the first inflow hole 6231 can be made. Accordingly, the first inflow hole 6231 is constructed to be in contact with the bottom face 653 of the cover water channel 65 so that water received in the cover water channel 65 can flow into the first inflow hole 6231.

In other words, a portion of a diameter of one end of the first inflow hole 6231 exposed toward the inside of the cover water channel 65 can be in contact with the bottom face 653 of the cover water channel 65.

Thus, after the supply of water from the water supply channel is finished, the water supplied to the cover water channel 65 does not remain on the bottom face 653 of the cover water channel 65 but an entire amount thereof flows into the first inflow hole 6231 and can be supplied to the medium.

Further, after the supply of water from the supply channel is finished, the water supplied to the cover water channel 65 does not remain on the bottom face 653 of the cover water channel 65. Thus, the water inside the cover water channel 65 exposed to the outside-air and the light energy source be protected from contamination.

Further, a vertical level of the first inflow hole 6231 can correspond to a vertical level of the lower end of the cultivation medium hole in which the seeds of the cultivation medium 64 are embedded. Thereby, water can be supplied directly from the first inflow hole 6231 to the cultivation medium 64.

In some implementations, a longitudinal direction 11 of the cultivation medium receiving portion 623 along an extending direction of the first cover water channel 6551 can be equal to a transverse length 12 of the cultivation medium receiving portion 623 perpendicular to the extending direction of the first cover water channel 6551. The longitudinal and transverse lengths 11 and 12 of the cultivation medium receiving portion 623 can be sized based on a shape of the cultivation medium 64.

A width 13 of the cover water channel 65 perpendicular to the extending direction of the first cover water channel 6551 can be defined to be larger than each of the transverse lengths 11 and 12 of the cultivation medium receiving portion 623. Thus, the flow of water along the cover water channel 65 can be achieved smoothly.

Further, the cultivation medium receiving portion 623 can be spaced apart from a sidewall 654 of the cover water channel 65 by a predefined spacing 15. The predefined spacing 15 between the sidewalls 654 of the cover water channel 65 and the cultivation medium receiving portion 623 can be sized so that the flow of water along the cover water channel 65 is not too fast.

The predefined spacing 15 can be appropriately designed based on a vertical dimension of the cover water channel 65 in the top face of the cover 62, a size of the cultivation medium receiving portion 623, and an amount of water supplied to the cover water channel 65.

Further, the sidewall 654 of the cover water channel 65 can be formed such that a portion thereof facing toward the cultivation medium receiving portion 623 is recessed in a direction away from the cultivation medium receiving portion 623.

In other words, the portion of the sidewall 654 of the cover water channel 65 facing toward the cultivation medium receiving portion 623 closest thereto can be recessed so as to be spaced from the cultivation medium receiving portion 623 by the predefined spacing 14, thereby defining a predetermined space between the cultivation medium receiving portion 623 and the sidewall.

Thus, the water moving around the cultivation medium receiving portion 623 can be received in a larger amount in a space between the cultivation medium receiving portion 623 and the sidewall 654 of the cover water channel 65.

Thus, a time duration for which the water received in the space between the cultivation medium receiving portion 623 and the sidewall 654 of the cover water channel 65 is in contact with the cultivation medium receiving portion 623 can be increased. Thus, a time duration for which the water flows into the second inflow hole 6232 of the cultivation medium receiving portion 623 can be increased.

In some implementations, the cover water channel 65 can include protrusions 6571 and 6573 protruding upward from the bottom face 653 of the cover water channel 65. The protrusions 6571 and 6573 can include a first protrusion 6571 positioned on one side of the cover 62 and positioned closer to the water supply 40 than the cultivation medium receiving portion 623 is.

Further, the protrusions 6571 and 6573 can further include a second protrusion 6573 located on the opposite side of the cover. The first protrusion 6571 and the second protrusion 6573 can be respectively disposed at one side and the opposite side in the extending direction of the first cover water channel.

Because the first protrusion 6571 and the second protrusion 6573 are disposed at one side and the opposite side, respectively, a flow rate of water moving inside the cover water channel 65 can be kept constant.

The cover water channel 65 can include a second inflow hole 6575 defined in a top face of each of the protrusions 6571 and 6573 and communicating with the inside of the cultivation vessel. In other words, the second inflow hole 6575 can be constructed to communicate with the cultivation medium receiving space S2. Water from the cover water channel 65 can flow into the cultivation medium 64 through the second inflow hole 6575.

Further, when the water supplied to the cover water channel 65 inflows into a cover through-hole 6233 defined in a top face of the cultivation medium receiving portion 623, an amount of water to be supplied to the root of the plant decreases. This adversely affects the growth of the plant.

Therefore, the vertical dimension H4 from the bottom face 653 of the cover water channel 65 to the second inflow hole 6575 can be smaller than the vertical dimension H2 from the bottom face 653 of the cover water channel 65 to the cover through-hole 6233. Thus, the water supplied to the cover water channel 65 can be prevented from flowing into the cover through-hole 6233.

In other words, the vertical dimension H4 from the bottom face 653 of the cover water channel 65 to the second inflow hole 6575 can be smaller than the vertical dimension H2 from the bottom face 653 of the cover water channel 65 to the cover through-hole 6233. In this connection, when the vertical level of the water in the cover water channel 65 is higher than or equal to the vertical level H4 of the second inflow hole 6575, the water inside the cover water channel 65 can be discharged through the second inflow hole 6575. Thus, the water supplied to the cover water channel 65 can be prevented from flowing into the cover through-hole 6233.

Further, when the amount of water supplied from the supply channel to the cover water channel 65 is too large, the water supplied to the cover water channel 65 through the second inflow hole 6575 can be guided to the cultivation medium receiving space S2.

In some implementations, the first protrusion 6571 can be located closer to the water supply 40 than the second protrusion 6573 can be. Thus, when a vertical level of the water in the cover water channel 65 is greater than or equal to the vertical level H4 of the second inflow hole 6575, an amount of the water discharged into the second inflow hole 6575 of the first protrusion 6571 can be greater than an amount of water discharged into the second inflow hole 6575 of the second protrusion 6573.

Further, due to the presence of the second protrusion 6573, water can be discharged more smoothly to the cultivation medium receiving space S2 than when only the first protrusion 6571 is present.

Further, the first protrusion 6571 can be located closer to the water supply 40 than the cultivation medium receiving portion 623 can be. Thus, the water supplied from the water supply 40 can be prevented from flowing into the cover through-hole 6233. When water is supplied to the cultivation medium through the first inflow hole 6231 of the cultivation medium receiving portion 623, the reliability of the supply can be improved.

Further, depending on the type of the plant cultivated in the plant cultivation apparatus 1, an amount of the water supplied to the cultivator 60 can be greater than an amount in which the cover water channel 65 can receive the water. In this connection, the water can be simultaneously supplied to the upper end and lower end of the cultivation medium through the second inflow hole 6575 defined in the protrusion and the first inflow hole 6231 defined in the cultivation medium receiving portion.

In some implementations, the supply channel can have a discharge outlet 413 through which water is discharged to the cover water channel 65. The cover 62 can include the cover water collector 625 that is located below the discharge outlet 413 and receives the water discharged from the discharge outlet 413. The cover water channel 65 can be constructed to be connected to the cover water collector 625 and receive water therefrom.

Further, the water collector 625 can be disposed at each of one side and the opposite side in the direction in which the cover water channel 65 extends. The first protrusion 6571 can include a pair of protrusions. The water collector 625 can be positioned between the pair of the first protrusions 6571 and can collect the water supplied from the discharge outlet 413 and guide the collected water to the cover water channel 65.

Further, the water collector 625 can have a predetermined vertical dimension H4 based on the bottom face 653 of the cover water channel 65. The water collector 625 can be inclined such that a vertical level thereof is lowered as the water collector 625 extends toward the cover water channel 65. One end thereof connected to the cover water channel 65 together with the bottom face 653 of the cover water channel 65 can define a continuous face.

When the vertical dimension of the discharge holes 41511 and 41521 from the bottom face 653 of the cover water channel 65 is excessively larger, water falling to the water collector 625 can flow out of the cover water channel 65. However, due to the structure in which the water collector 625 has the inclination such that a vertical level thereof is lowered as the water collector 625 extends toward the cover water channel 65, the water collector 625 can minimize water leakage to the outside of the cover water channel 65 while stably guiding the water toward the cover water channel 65.

Further, the second protrusion 6573 can include a pair of protrusions. The cover water collector 625 can be disposed between the pair of the second protrusions. As described above, the cultivator can be formed symmetrically in a direction in which the cultivator extends, that is, a direction from one side to the opposite side thereof. Thus, even when the second protrusion 6573 is located to be closer to the supply than the first protrusion 6571 is, the cultivator 60 can have the same appearance as that when the first protrusion 6571 is closer to the supply than the second protrusion 6573. The first and second protrusions can perform the same function.

Figure 11A:
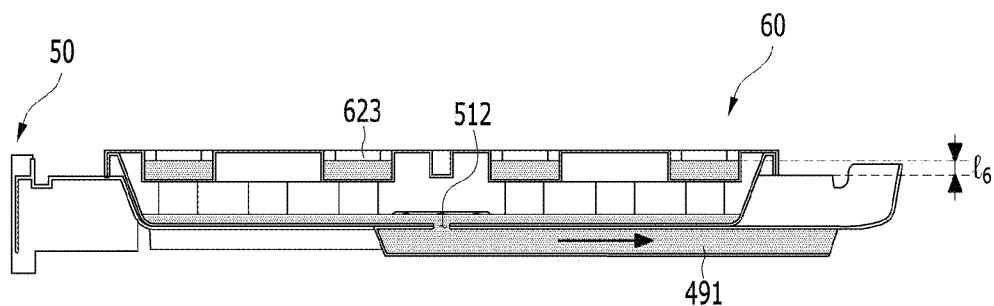
FIGS. 11A to 11C are side views showing an example of a process in which water flows into and is discharged from a cultivator.
Figure 11B:
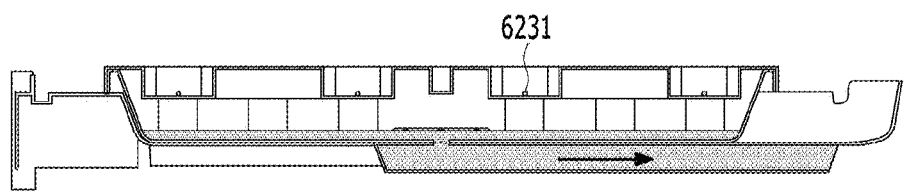
Figure 11C:
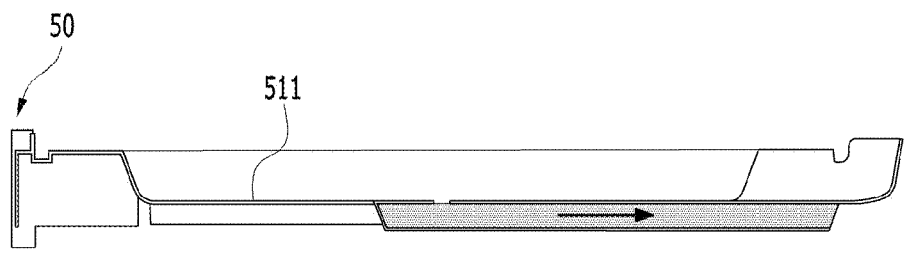

FIGS. 11A to 11C are side views showing an example of a process in which water flows into and is discharged from the cultivator shown in FIG. 8 in the plant cultivation apparatus. Hereinafter, descriptions duplicate with those of the above-described structures will be omitted.

FIGS. 11A and 11B are diagrams showing an example of a process in which the water supplied to the cover water channel 65 is discharged to the water discharge channels 4911 and 4913 when the cultivator 60 including the cover water channel 65 is seated on the bed 50. Referring to FIGS. 11A and 11B, a flow path of water supplied from the supply in the cover water channel 65 is described.

As shown in FIG. 11A, the supply channel can supply the water for the plant to the cover water collector 625 through the discharge outlet 413 facing toward the cover water collector 625. In this case, a vertical level of the water supplied to the cover water channel 65 can be lower than or equal to a vertical level 16 of each of the second inflow hole 6575 and the cover water collector 625.

In some examples, when the vertical level of the water supplied to the cover water channel 65 is higher than the vertical level 16 of each of the cover water collector 625 and the second inflow hole 6575, the water from the cover water channel 65 can be guided to the cultivation medium receiving space S2 through the second inflow hole 6575. At the same time, the water flowing into the cultivation medium receiving space S2 can be discharged to the water discharge channels 4911 and 4913 through the discharge hole 6135 of the cultivation vessel 61.

In some implementations, the water supplied to the cover water channel 65 can be supplied to the upper end of the cultivation medium 64 through the first inflow hole 6231. The vertical level of the water in the cultivation medium receiving space S2 can be lower than the vertical level of the cultivation medium hole 643, so that the condition in which the roots of the plant to breathe can be created. Due to this condition, the reliability of the growth of the plant can be improved.

As shown in FIG. 11B, the water supply from the water supply 40 to the cultivator 60 is terminated, and an entire amount of the water received in the cover water channel 65 through the first inflow hole 6231 can be totally supplied to the cultivation medium 64.

In this connection, the first inflow hole 6231 can be adjacent to the bottom face 653 of the cover water channel 65, such that an entire amount of the water in the cover water channel 65 can be discharged through the first inflow hole 6231.

In some implementations, in this case, depending on the growth state of the plant, the water flowing into the cultivation medium receiving space S2 can stop being discharged to the water discharge channels 4911 and 4913 through the discharge hole 6135 of the cultivation vessel 61. Further, in some examples, the water flowing into the cultivation medium receiving space S2 can be discharged to the water discharge channels 4911 and 4913 through the discharge hole 6135 of the cultivation vessel 61.

As shown in FIG. 11C, the number of the supply channels corresponds to the number of the beds 50. Each supply channel is partially disposed above the cultivation vessel receiving portion 511. Thus, water can be supplied from the supply channel through the discharge outlet 413 even when the harvest of the plant grown in the cultivator 60 has been finished or the cultivator 60 is separated from the bed 50.

In this case, the water supplied from the supply through the seat communication hole 512 defined in the bottom face of the cultivation vessel receiving portion 511 can be discharged to the water discharge channels 4911 and 4913 and can then be collected into the storage 43.

Figure 12:
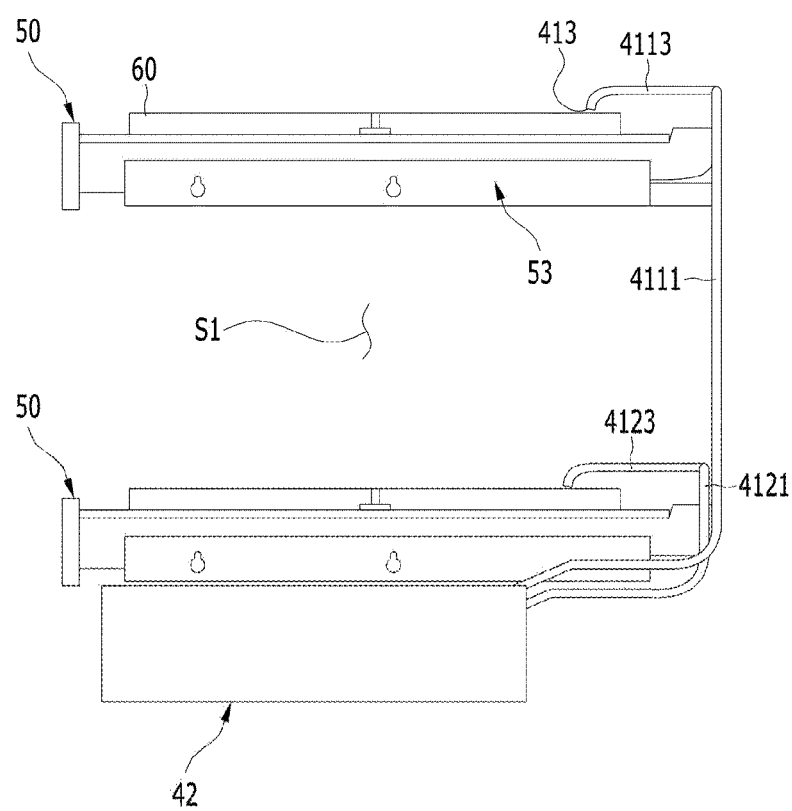
FIG. 12 is a side view showing an example of a water supply in the plant cultivation apparatus.
Figure 13:
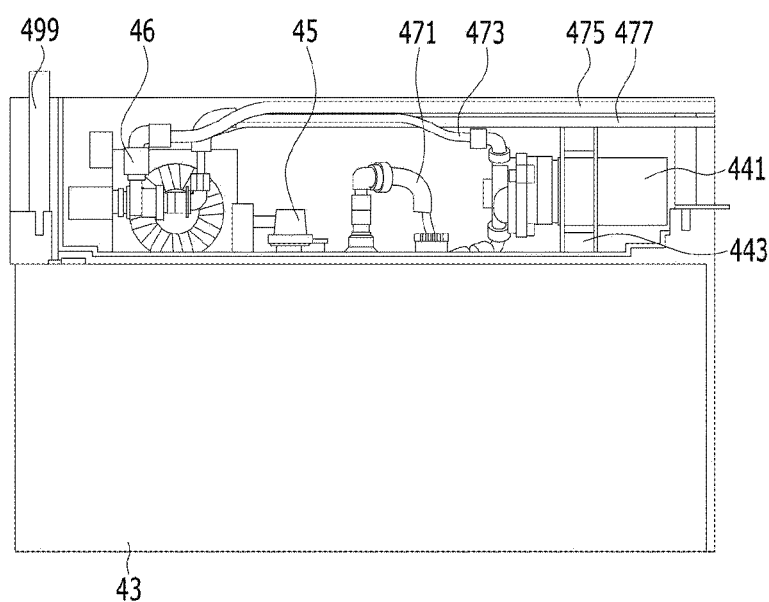
FIG. 13 is a top face view showing an inside of the water supply in the plant cultivation apparatus.

In some implementations, FIG. 12 is a side view showing the water supply in the plant cultivation apparatus. FIG. 13 is a top view of the inside of the water supply in the plant cultivation apparatus. Hereinafter, descriptions duplicate with those of the above-described structure will be omitted.

A cultivation space S1 in which a plant is cultivated can be defined between the upper bed 50 of the plurality of beds and the lower bed 50 thereof.

Further, the water supply can include the first supply channel 411 that supplies water to the cover water channel 65 of the upper bed 50 of the plurality of bed 50 and the second supply channel 412 that supplies water to the cover water channel 65 of the lower bed 50 of the plurality of bed 50.

Further, each of the first supply channel 411 and the second supply channel 412 is disposed independently and extends to face toward the cultivator 60 to supply water for plant growth thereto.

The first supply channel 411 can include a first supply flow channel 4111 connected to the storage 43 and extending upwardly, and acing as a passage through which water from the storage 43 flows upwards, and a plurality of first supply branch channels 4113 branching from the first supply flow channel 4111 and extending towards the cover water channel 65 of the cultivator 60.

The second supply channel 412 can include a second supply flow channel 4121 connected to the storage 43 and extending upwardly, and acing as a passage through which water from the storage 43 flows upwards, and a plurality of second supply branch channels 4123 branching from the second supply flow channel 4121 and extending towards the cover water channel 65 of the cultivator 60.

As shown in FIG. 13, the water supply 40 can include the storage 43 in which the water supplied to the plant is stored, and the supply pump 44 connected to the storage 43 and configured to pump the water of the storage 43 to the supply. Further, the water supply 40 can include a discharger that is connected to the storage and includes the water discharge channels 4911 and 4913 for collection of water inside the cultivator 60.

That is, the water supply casing 42 can be disposed below the lower bed 50, and can receive therein the storage 43, the supply pump 44, the flow sensor 45, the branching valve 46, and the connective channel 47.

The water supply 40 can include the water supply casing 42, the components positioned inside the water supply casing, and pipes connected to these components.

The storage 43 can be retractable and extendable in frontward and rearward directions and can be disposed inside the cabinet 10, and can have a separable structure.

Therefore, the water can be easily supplied to the storage 43. The user can easily clean and maintain the storage 43.

Further, the water supply casing 42 can have an inner space for receiving the connective channel 47, the supply pump 44, the flow sensor 45, the branching valve 46, and the like. In some implementations, the plant cultivation apparatus can include a controller configured to control one or more of the supply pump 44, the flow sensor 45, and the branching valve 46. For example, the controller may include an electric circuit, an electronic controller, a processor, or the like. In some cases, the controller 90 may be provided separately from the cabinet 10.

The supply pump 44 can include a pump 441 configured to pump water to the supply channel and a pump support 443 securing the pump 441 to the cabinet.

In some examples, in the storage 43, the nutrient liquid for the plant can be stored. Water from the storage can be supplied to the supply channel through a first connective channel 471 connected to the pump 441 of the supply pump 44.

In some implementations, the flow sensor 45 detects the flow rate of supplied water, and prevents the water from overflowing out of the cultivator 60 due to excessive water supply thereto. Further, the amount of the water supplied to the cultivator 60 can be controlled based on the quantitative water supply through the flow sensor 45. Thus, an optimal amount of water to each plant growth stage can be fed to the cultivator 60. This can prevent excessive moisture from being stored in the cultivator 60. This allows the cultivator 60 to be kept clean at all times. Adequate humidity in the bed 50 and the cultivation space S1 can be maintained.

In some implementations, the branching valve 46 can be opened when the pump 441 is activated so that the water can be supplied toward the supply channel. The branching valve 46 can be connected to a plurality of connective channels respectively connected to the plurality of channels of the supply channel respectively corresponding to the plurality of the beds.

That is, as shown in the drawing, the branching valve 46 can be connected to a third connective channel 475 connected to the first supply channel 411 and a fourth connective channel 477 connected to the second supply channel 412.

The storage 43 and the pump 441 can be connected to each other via the first connective channel 471. The pump 441 and the branching valve 46 can be connected to each other via the second connective channel 473.

Further, the water discharged from the second connective channel 473 can flow to each of the third connective channel 475 and the fourth connective channel 477 via the branching valve 46. The water can be supplied to each of the first supply channel 411 and the second supply channel 412.

That is, under the operation of the pump 441, the water of the storage 43 can be supplied to the cultivator 60 or the bed 50 through the branching valve 46.

In some implementations, the water supply 40 can include the discharger constructed so that the water discharged from the cultivator 60 is collected into the discharger which supplies the collected water into the storage 43. The discharger can include a discharger collection channel 499 connected to the storage 43. The discharger collection channel 499 can be constructed to be connected to the storage 43 so that water from a discharger connective channel 493 to be described later is collected into the discharger collection channel 499.

Figure 14:
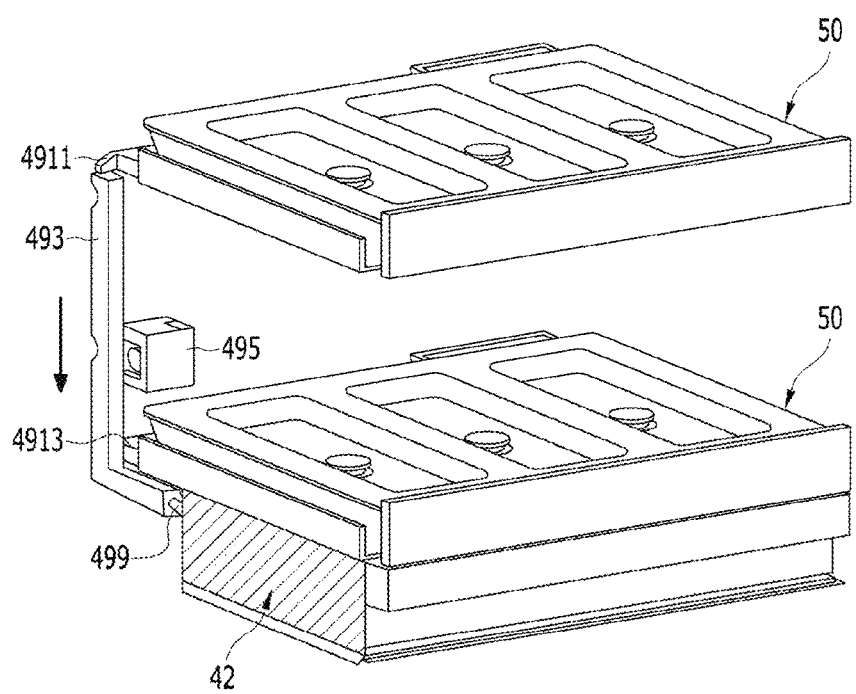
FIG. 14 is a perspective view showing examples of a bed and a discharger in the plant cultivation apparatus.

In some implementations, FIG. 14 is a perspective view showing a bed and a discharger in the plant cultivation apparatus. Hereinafter, descriptions duplicate with those of the above-described structure will be omitted.

The discharger can include the water discharge channels 4911 and 4913 which communicate with the seat communication hole 512 of the bed 50 and collect the water of the cultivation medium receiving space S2. The water discharge channels 4911 and 4913 can be defined in the bed 50. The water discharge channels 4911 and 4913 can include the first discharge channel 4911 defined in the upper bed 50 and the second discharge channel 4913 defined in the lower bed 50.

The discharger can include the discharger connective channel 493 for connecting the discharger collection channel 499 to the water discharge channels 4911 and 4913. The collected water can flow in and along the discharger connective channel 493. The discharger connective channel 493 can extend vertically. The first discharge channel 4911 and the second discharge channel 4913 can be constructed to be connected to the discharger connective channel 493.

In some implementations, the discharger can include a discharger pump 495 that is connected to the discharger connective channel 493 and pumps the water collected in the discharger connective channel 493 to the storage 43.

Further, when the discharger pump 495 is activated, the water of the cultivation medium receiving space S2 can be collected into the discharger. When the operation of the discharge pump 495 is deactivated, the water in the cultivation medium receiving space S2 may not be collected into the discharger.

At least a portion of the discharger collection channel 499 connecting the discharger connective channel 493 with the storage 43 can be disposed inside the water supply casing 42 and can be connected to the storage 43.

Although various implementations of the present disclosure have been described in detail, those of ordinary skill in the art to which the present disclosure pertains can make various modifications to the above-described various implementations without departing from the scope of the present disclosure. The scope of the present disclosure should not be limited to the described various implementations and should be defined by the claims to be described later, and equivalents to the claims.

What is claimed is:

1. A plant cultivation apparatus comprising:
   a cabinet;
   a bed disposed in the cabinet;
   a cultivator configured to be disposed on the bed and to accommodate a cultivation medium therein, the cultivation medium being configured to accommodate at least a portion of a plant, the cultivator comprising (i) a cultivation vessel that is configured to be disposed on the bed and has an open top and (ii) a cover that is configured to cover at least a portion of the open top of the cultivation vessel and defines a cover water channel at an upper surface of the cover; and
   a water supply disposed inside the cabinet and configured to supply water to the cover water channel, at least a portion of the water supply being located above the cover water channel,
   wherein the cover water channel is in fluid communication with an inside of the cultivator and configured to guide the water supplied from the water supply to the cultivation medium in the inside of the cultivator,
   wherein the cover comprises a cultivation medium receiving portion that is configured to accommodate an upper end of the cultivation medium, wherein the cover defines;
    a first inflow hole in the cover water channel, the first inflow hole being configured to fluidly communicate the cover water channel with an inside of the cultivation medium receiving portion,
    a second inflow hole in the cover water channel, the second inflow hole being in fluid communication with an inside of the cultivation vessel, wherein a vertical level of the second inflow hole is higher than a vertical level of the first inflow hole, and
    a cover through-hole at a top surface of the cultivation medium receiving portion, the cover through-hole being configured to receive the plant based on the plant growing therethrough, wherein a vertical level of the cover through-hole is higher than the vertical level of the second inflow hole, and
wherein the cultivation medium receiving portion is configured to block water in the cover water channel from flowing into the cover through-hole.

2. The plant cultivation apparatus of claim 1, wherein the first inflow hole is configured to supply the water from the cover water channel to the cultivation medium, and
    wherein the cover water channel overlaps with at least a portion of the cultivation medium receiving portion.

3. The plant cultivation apparatus of claim 2, wherein the cover water channel is recessed from a portion of the upper surface of the cover, and
    wherein the cultivation medium receiving portion is disposed in the cover water channel and protrudes upward relative to a bottom surface of the cover water channel.

4. The plant cultivation apparatus of claim 3, wherein the cultivation medium receiving portion is positioned within the cover water channel and configured to be surrounded by the water received in the cover water channel, and
    wherein the first inflow hole is defined at a periphery of the cultivation medium receiving portion.

5. The plant cultivation apparatus of claim 4, wherein the cultivation medium receiving portion has an inner surface configured to contact the cultivation medium that is inserted to the cultivation medium receiving portion, and
    wherein the first inflow hole passes through the inner surface of the cultivation medium receiving portion and is configured to supply the water received in the cover water channel to the cultivation medium.

6. The plant cultivation apparatus of claim 4, wherein at least a portion of the first inflow hole is defined at the bottom surface of the cover water channel.

7. The plant cultivation apparatus of claim 4, wherein the cover water channel comprises a sidewall that faces the cultivation medium receiving portion and is horizontally spaced apart from the cultivation medium receiving portion.

8. The plant cultivation apparatus of claim 4, wherein the cover further comprises a protrusion that is disposed in the cover water channel and protrudes upward from the bottom surface of the cover water channel, the protrusion defining the second inflow hole at a top surface thereof.

9. The plant cultivation apparatus of claim 8, wherein the vertical level of the second inflow hole is lower than a vertical level of the upper surface of the cover.

10. The plant cultivation apparatus of claim 4, wherein the cover further comprises a first protrusion that is located at a first side of the cover, that is disposed in the cover water channel, and that protrudes upward from the bottom surface of the cover water channel, the first protrusion defining the second inflow hole at a top surface thereof, and
    wherein a distance between the first protrusion and the water supply is less than a distance between the cultivation medium receiving portion and the water supply.

11. The plant cultivation apparatus of claim 10, wherein the cover further comprises a second protrusion that is located at a second side of the cover, that is disposed in the cover water channel, and that protrudes upward from the bottom surface of the cover water channel, the second protrusion defining another second inflow hole at a top surface thereof.

12. The plant cultivation apparatus of claim 10, wherein the water supply defines a discharge outlet configured to discharge water to the cover water channel, and
    wherein the cover includes a water collecting recess defined at a side of the cover water channel, the water collecting recess being located below the discharge outlet and configured to receive the water discharged from the discharge outlet and to provide the received water to the cover water channel.

13. The plant cultivation apparatus of claim 12, wherein the cover comprises a pair of first protrusions that are located at the first side of the cover, that are disposed in the cover water channel, and that protrude upward from the bottom surface of the cover water channel,
    wherein one of the pair of first protrusions is the first protrusion defining the second inflow hole at the top surface thereof,
    wherein the other one of the pair of first protrusions defines another second inflow hole at a top surface thereof, and
    wherein the water collecting recess is defined between the pair of first protrusions.

14. The plant cultivation apparatus of claim 1, wherein the cover water channel comprises:
    a first cover water channel that extends from a first side of the cover to a second side of the cover; and
    a second cover water channel branched from the first cover water channel, and
wherein the cover comprises a plurality of cultivation medium receiving portions that are configured to accommodate upper ends of a plurality of cultivation media, respectively, and that are disposed in the first cover water channel and the second cover water channel.

15. The plant cultivation apparatus of claim 1, wherein the cultivation vessel defines a discharge hole configured to discharge water in the cultivation vessel to the bed, and
    wherein the bed defines a water discharge channel configured to receive the water discharged from the discharge hole and to guide the received water to the water supply.

16. The plant cultivation apparatus of claim 15, wherein the water supply comprises:
    a storage configured to store water; and
    a supply channel that is connected to the storage and extends to a position above the cover water channel, the supply channel being configured to supply the water from the storage to the cover water channel, and
wherein the water discharge channel is connected to the storage and configured to guide the water discharged through the discharge hole into the storage.

17. The plant cultivation apparatus of claim 16, wherein the water supply further comprises:
    a water supply casing that defines the storage and is disposed below the bed; and a supply pump configured to move the water from the storage to the position above the cover water channel through the supply channel.

18. The plant cultivation apparatus of claim 1, wherein the cultivation medium receiving portion is configured to cover the upper end of the cultivation medium, and wherein the first inflow hole is defined at a periphery of the cultivation medium receiving portion.

19. The plant cultivation apparatus of claim 1, wherein the cultivation medium receiving portion is configured to cover the upper end of the cultivation medium, and wherein the first inflow hole is defined at a boundary between the cultivation medium receiving portion and the cover water channel.

* * * * *